United States Patent [19]

Dwyer, Jr.

[11] 4,313,265
[45] Feb. 2, 1982

[54] PROCESS FOR PREPARING MICROPOROUS STRUCTURED SOLUBLE COFFEE PRODUCT

[75] Inventor: Daniel E. Dwyer, Jr., Long Valley, N.J.

[73] Assignee: General Foods Corporation, White Plains, N.Y.

[21] Appl. No.: 139,060

[22] Filed: Apr. 10, 1980

[51] Int. Cl.³ ............................ A23F 5/32; A23F 5/46
[52] U.S. Cl. ........................................... 34/5; 426/594; 426/385; 426/386; 426/387; 426/388; 62/64
[58] Field of Search ................... 34/5; 62/64, 66, 75; 426/594, 385, 386, 387, 388

[56] References Cited

U.S. PATENT DOCUMENTS 4,073,158  2/1978  Guiller ............................ 62/64 X
4,077,227  3/1978  Larson ............................ 62/74

*Primary Examiner*—Joseph M. Golian
*Attorney, Agent, or Firm*—Thomas V. Sullivan; Thomas R. Savoie; Bruno P. Struzzi

[57] ABSTRACT

A freeze-dried soluble coffee product in the form of particles or granules and having a microporous structure is prepared by prechilling a metal plate in a liquid refrigerant, immersing the plate in aqueous extract of coffee solids, reimmersing the plate in a liquid refrigerant, removing the frozen particles in the form of flakes from the plate, grinding and freeze-drying the flakes to produce frozen extract particles with reduced entrainment losses. The product so prepared has a unique porosity and is capable of sorbing, retaining and releasing volatile aromatic compounds.

6 Claims, No Drawings

PROCESS FOR PREPARING MICROPOROUS STRUCTURED SOLUBLE COFFEE PRODUCT

CROSS REFERENCE TO RELATED APPLICATIONS

This application is related to applications Ser. Nos. 950,337, filed Oct. 10, 1978 and 086,367, filed Oct. 18, 1979 abandoned in favor of continuation applications Ser. Nos. 189,515, filed Sept. 22, 1980, and 235,506 filed Feb. 18, 1981, all owned by the assignee of this application.

TECHNICAL FIELD

The present invention relates to soluble coffee. More particularly, it relates to a process for preparing a freeze-dried soluble coffee product in the form of particles or granules which have a unique microporosity capable of sorbing and retaining volatile aromatic compounds and releasing these volatile aromatic compounds in a controlled manner.

BACKGROUND ART

Many commercial soluble coffee products are enhanced with volatile aromatic compounds by combining the soluble coffee product with pure coffee oil or aroma-enriched coffee oil so as to provide the soluble coffee product with an aromatic quality more like that of roasted and ground coffee. However, aromatizing a soluble coffee product with coffee oil presents plant processing problems in recovery of the oil from the roasted coffee beans and processing of the retaining deoiled coffee beans and in storage of the oil.

Generally, headspace aromatization of soluble coffee products without the use of coffee oil as an aroma source or aroma carrier has not met with marked commercial success. It is known that conventionally produced soluble coffee solids lack the capacity or property of sorbing, retaining and releasing volatile aromatic compounds such as are contained in, or added to, coffee oil.

In applications Ser. Nos. 950,337 and 086,367, now applications Ser. Nos. 189,515 and 235,506 hereinbefore referred to, porous soluble coffee particles having the capacity to sorb large quantities of volatile aromatics, to retain the aromatics for extended periods of time, and subsequently, to release the aromatics under repeated in-use conditions such as may be encountered in opening and closing a container in which the particles are packaged are described and claimed. The aromatized soluble coffee particles may be added in small amounts and mixed with or added to unaromatized soluble coffee solids to provide a soluble coffee product with a desirable coffee aroma such as the aroma of freshly roasted and ground coffee.

The porous soluble coffee particles having an average diameter of less than 200 microns are characterized as being microporous, that is, by having a microporous structure wherein the most probable radius of the pores is 150 Å or less and the pore volume per gram of dry soluble coffee solids is from 3 to 30 microliters per gram. These microporous structured soluble coffee particles are prepared by instantaneously freezing an aqueous extract or solution of coffee solids as by spraying the extract solution into a cryogenic fluid and subsequently freeze-drying the frozen particles, spheres or granules.

While the methods described and claimed in the hereinbefore mentioned patent applications are capable of producing microporous structured soluble coffee, there would be advantages to preventing entrainment losses in the freeze-drying equipment which losses may result when the size of the individually frozen particles, granules or spheres as prepared by freezing a spray is not optimized. Further, there would be advantages to an even more controlled freezing method or process so that the freezing rates and, thus, the ice crystal size might be more carefully controlled.

DISCLOSURE OF THE INVENTION

It has now been discovered that a microporous structured freeze-dried coffee product may be obtained by
  (a) prechilling a metal plate in a liquid refrigerant maintained at a temperature of $-195°$ C. to $-73°$ C.;
  (b) quickly immersing the plate in an aqueous extract or solution of coffee solids where a thin layer of the extract adheres to and becomes frozen on the plate;
  (c) reimmersing the plate, on which the frozen coffee extract is adhering, in a liquid refrigerant;
  (d) removing the extract from the plate and collecting the frozen extract in the form of flakes;
  (e) grinding the flakes to produce particles; and
  (f) freeze-drying the frozen extract particles.

The resulting freeze-dried soluble coffee particles, which may optionally be ground again, are found to have a microporous structure which makes them suitable for sorbing, retaining and releasing aromatic volatile compounds.

While it is not intended that the present invention be restricted by any particular theoretical explanation, it appears that most, if not all, freezing equipment utilizes belts, drums, etc. that freeze from one side, and present the complication of the evolution of large quantities of vapor when using a refrigerant such as, for example, liquid nitrogen, carbon dioxide, fluorinated hydrocarbons, and the like. This vapor normally interferes with the heat transfer, thus increasing the freezing time. The process of the present invention freezes the extract film from both sides of the plate and in the first step, during cold plate immersion in the solution, circumvents the problem of vapor evolution. In the re-immersion step vapor is evolved, but direct submerged contact of the refrigerant and the remaining small amount of unfrozen material results in a rapid freeze.

The invention thus offers a simple, commercially feasible method of controlled freezing for the preparation of discrete microporous structured particles.

By freezing coffee extract in an extremely rapid manner, (in the order of 1 second to 10 seconds), a specific mircroporous structure may be formed which may also be further controlled by modifications of time, refrigerant, plate material or thickness, extract concentration and the like.

This structure, upon freeze-drying, results in a microporous dry product that exhibits the ability to "fix" various aromas. The frozen material is also found to be surprisingly easy to freeze-dry as compared to other more slowly frozen extracts because of the controlled freezing method and the control of particle size.

BEST MODE FOR CARRYING OUT THE INVENTION

The starting extract may be a water solution of soluble coffee solids at 10 to 60% soluble solids, formed by any one or a combination of various techniques including percolation extraction of roasted and ground coffees, dissolving previously dried soluble coffee solids in water, recovery of soluble coffee components from waste coffee streams such as press liquors, and the like. Evaporation may be used to achieve desired concentration with any of the foregoing. Generally, the extract temperature is maintained between about 2° to 30° C. prior to immersion of the plate in the freezing apparatus.

Any liquid refrigerant at its boiling point may be employed provided the normal boiling point lies in the −195° C. to −73° C. range, and in which coffee is relatively isoluble. Preferably, liquid nitrogen is employed.

In the prechilling step, the plate, which may be grooved, corrugated or ribbed and fabricated from steel, stainless steel, aluminum, silver or other metal of high conductivity, and having a thickness of 3 to 12 mm, is immersed in the refrigerant for a period of 10 seconds to 2 minutes. The plate is removed from the refrigerant and within 1 to 10 seconds is inserted into the extract. After immersion of the plate in the coffee solution for 1 to 10 seconds, the plate is removed from the coffee solution and reimmersed in the refrigerant within 2 to 10 seconds. The plate is held in the refrigerant with coffee solution on plate for 10 seconds to 5 minutes. Frozen extract layer thickness of 0.25 to 5 mm builds up on the plate which is usually immersed to a depth of 2.5 to 30 cm.

The atmosphere in contact with plate and coffee may be ambient air, an inert gas, or air whose relative humidity is controlled. Following the freezing of the extract upon reimmersion, the frozen extract flakes, typically having a size of 2.5×0.5 cm, are recovered, ground and freeze-dried in conventional freeze-drying equipment.

However, freeze-drying processing conditions must be carefully controlled to insure there is little, or no melting of the ice crystals during dehydration of the frozen coffee extract particles.

Upon analysis the microporous structured product is found to have micropores whose average radius is 10 to 100 Å and a surface area of 1 to 25 m$^2$/g.

The volatile aromatic compounds associated with coffee, whether natural or synthetic, to be sorbed on the microporous structured product may be derived from many sources well-known to those skilled in the art. Depending on the method of contact to be employed, the compounds may be present as a component of a gas, a liquid condensate or a condensed frost.

The method of contacting the microporous particles with the volatile aromatic compounds for the purpose of sorbing aroma within the particles can also be many and varied. The use of high pressure and/or low particle temperatures may be employed in order to maximize the quantity of aroma sorbed or to shorten the period of time required to achieve a desired level of aromatization.

The microporous structured soluble coffee product prepared by the process of the invention has the capability of sorbing 80 to 90% by weight of volatile coffee aromatic compounds. This is, in general, in excess of that which is required and, depending on how the aromatized soluble coffee solids are utilized, the aromatized particles will contain volatile aromatic compounds at a level of from 0.05 to 20 milligrams per gram of solids, 0.2 to 0.5% by weight.

EXAMPLE

A 33% aqueous coffee solution is formed by dissolving soluble coffee solids in water. This extract is placed in an insulated tank where it is maintained at 15° to 20° C.

Liquid nitrogen is introduced to an insulated refrigerant tank where it is maintained at its normal boiling point of −195° C.

A metal freezing plate fabricated from stainless steel is immersed in the liquid refrigerant tank until it is chilled thoroughly, approximately 30 seconds. The plate is then lifted and lowered into the coffee solution contained in the coffee solution tank. While immersed in the liquid extract for 1 to 2 seconds, a film of coffee freezes on the surface of the plate. The time of immersion determines the quantity of solution that will adhere to the plate. Generally the thickness is from 0.25 to 2 mm. Here, it is 1.2 mm. The plate is then moved up and out of the coffee solution and back into the liquid refrigerant. During this operation, a small amount of extract that is unfrozen (on the surface of the layer adhering to the plate) is quickly frozen by reimmersion into the refrigerant. At the same time (immersed in refrigerant) unequal contractions of the frozen layer take place, which tend to crack the product loose from the plate, where it is collected in a basket maintained within the liquid refrigerant tank. Some auxiliary agitation or scraping may be required to loosen all product. The plate, now free of coffee extract, is held in the refrigerant until it is ready for another cycle.

The frozen product is removed from the basket, ground in a refrigerated grinder such as a Fitz Mill to a particle size of at least 0.5 mm and then placed in chilled freeze-dried trays. The trays are placed in a freeze-drier and subjected to a vacuum under 100 microns of Hg. and a plate temperature −40° to 50° C. for a period of 18 hours. The vacuum on the freeze-drier is broken with dry carbon dioxide and the dry particles having a moisture content of below about 1.5% are removed from the freeze-drier and kept out of contact of moisture and are ground in a refrigerated grinder such as a Fitz mill to a particle size of 210 microns. The dry particles were found to have a microporous structure with an average radius of 35 to 45 Å pores and a surface area of 5 to 8 m$^2$/g.

The dry particles were subsequently chilled in dry ice under a dry atmosphere and mixed with coffee grinder gas frost at a weight ratio of 9 parts essentially moisture-free frost per 1.2 parts particles. The chilled particles, having a moisture content of below 2% by weight, were then packaged in glass jars with unplated, agglomerated spray-dried coffee solids at a level of 0.75% by weight of the spray-dried solids. The resulting jars were then stored at 21° C. for periods of eight weeks. Upon initial opening and during a standard seven-day, in-use cycle, a pleasing headspace aroma was found which was rated as being at least as good as the headspace aroma possessed by jars of comparably stored, aromatized, agglomerated spray-dried coffee which coffee had been plated with grinder gas-enriched coffee oil.

INDUSTRIAL APPLICABILITY

The microporous structured soluble coffee product prepared by the process of this invention is utilized as a sorbent for volatile aromatic compounds.

The process offers a simple, commercially feasible method of rapid freezing and control of freezing times and reduced entrainment losses on freeze-drying the frozen particles.

I claim:

1. A process for preparing a microporous structured freeze-dried coffee product comprising:
   (a) prechilling a metal plate in a liquid refrigerant maintained at a temperature of $-195°$ to $-73°$ C.;
   (b) quickly immersing the plate in an aqueous extract or solution of coffee solids where a thin layer of the extract adheres to and becomes frozen on the plate;
   (c) reimmersing the plate, on which the frozen coffee extract is adhering in said liquid refrigerant;
   (d) removing the frozen extract from the plate and collecting the frozen extract in the form of flakes;
   (e) grinding the flakes to produce particles; and
   (f) freeze-drying the frozen extract particles.

2. A process as in claim 1 in which the microporous structured freeze-dried coffee product micropores have an average radius of 10 to 100 Å and the product has a surface area of 1 to 25 $m^2/g$.

3. A process as in claim 2 in which the time for: prechilling in (a) is 10 seconds to 2 minutes; immersing in (b) is 1 to 10 seconds; and reimmersing in (c) is 10 seconds to 5 minutes.

4. A process as in claim 3 in which the thin layer in (b) has a thickness of 0.25 to 5 mm.

5. A process as in claim 4 in which the aqueous extract in (b) is maintained at a temperature of 2° to 30° C. prior to freezing.

6. A process as in claim 5 in which the solids content of the aqueous extract in (b) is from 10 to 60% by weight.

* * * * *